United States Patent Office 2,875,191
Patented Feb. 24, 1959

2,875,191
COPPER-CONTAINING TRISAZO DYESTUFFS

Walther Benade and Hermann Goebel, Leverkusen, Germany, assignors to Farbenfabriken Bayer Aktiengesellschaft, Leverkusen, Germany, a corporation of Germany No Drawing. Application February 26, 1957
Serial No. 642,355

Claims priority, application Germany March 10, 1956

5 Claims. (Cl. 260—147)

The present invention relates to copper-containing trisazo dyestuffs and to a process for their manufacture; more particularly it relates to copper complexes of polyazo dyestuffs corresponding to the formula

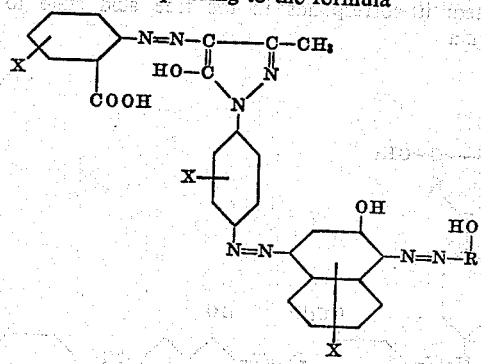

In this formula X means a hydrogen atom or a sulfonic acid group and R stands for a radical of an amino-hydroxy naphthalene-mono or disulfonic acid coupled in o-position to the hydroxyl group.

In accordance with the invention it has been found that valuable copper-containing trisazo dyestuffs may be obtained by combining diazotized 1-aminobenzene-2-carboxylic acid or its sulfonic acid derivatives, with 1-(4'-aminophenyl)-3-methyl-5-pyrazolone or its sulfonic acid derivatives, further diazotizing the monoazo dyestuffs thus obtained, and coupling them with 1-amino-2-ethoxy-naphthalene or its sulfonic acid derivatives, diazotizing again the amino-disazo dyestuffs thus obtained, and finally coupling them with an amino-hydroxynaphthalene mono- or disulfonic acid in o-position to the hydroxyl group, and treating the resulting trisazo dyestuffs with copper-yielding agents.

The copper-containing trisazo dyestuffs obtainable according to the process of the invention dye vegetable fibres in green to olive shades which distinguish themselves by a very good fastness to light.

The following examples are given for the purpose of illustrating the invention without, however, limiting it thereto.

Example 1

21.7 parts by weight of 2-amino-5-sulfobenzoic acid are diazotized with 6.9 parts by weight of sodium nitrite and 15 parts by weight of 35 percent hydrochloric acid, and coupled with 18.9 parts by weight of 1-(4'-aminophenyl)-3-methyl-5-pyrazolone. The monoazo dyestuff is dissolved with 8 parts by weight of sodium hydroxide, 6.9 parts by weight of sodium nitrite are added thereto, and the mixture is run into 45 parts by weight of a 35 percent hydrochloric acid and ice. After the diazotization is completed, 26.7 parts by weight of 1-amino-2-ethoxynaphthalene-6-sulfonic acid and 10 parts by weight of sodium acetate are added. The disazo dyestuff thus formed is salted out and isolated with the addition of 20 parts by weight of sodium carbonate at 80° C. The disazo dyestuff thus obtained is further diazotized with 6.9 parts by weight of sodium nitrite and 50 parts by weight of 35 percent hydrochloric acid; the diazo salt solution is run into an aqueous solution of 31.5 parts by weight of 2-phenylamino-5-hydroxynaphthalene-7-sulfonic acid in 420 parts by weight of pyridine and 50 parts by weight of aqueous ammonia. The trisazo dyestuff obtained corresponds in its free acid state to the formula:

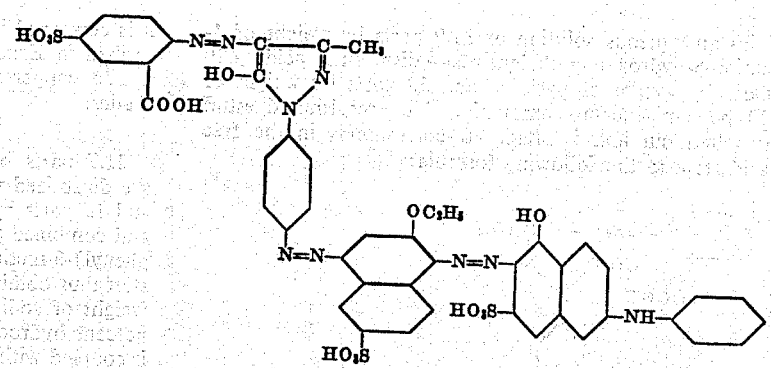

it is dissolved in water, 24 parts by weight of sodium acetate and 50 parts by weight of copper sulfate are added, and the dyestuff is converted into the copper complex compound by boiling for several hours. The copper-containing trisazo dyestuff is isolated and neutralized with stirring with a solution of sodium carbonate. Into a dye bath of 2 litres containing 1 gram of the above dyestuff, 2 grams of sodium carbonate and 20 grams of sodium sulfate, there are introduced at 50° C. 100 grams of a cotton fabric; the bath is heated to 90° C. and kept at this temperature for 1 hour. The cotton fabric is then rinsed with water and dried. Clear green shades of very good fastness to light are obtained.

If in the preparation of the dyestuff described in this example 2-phenylamino-5-hydroxynaphthalene-7-sulfonic acid is replaced by the equivalent amount of 2-(3'-carboxyphenylamino)-5-hydroxynaphthalene-7-sulfonic acid or 2-(3'-sulfophenylamino)-5-hydroxynaphthalene-7-sulfonic acid, similar dyestuffs are obtained. Instead of 2-amino-5-sulfobenzoic acid, 2-amino-4-sulfobenzoic acid may also be used as the starting component.

Example 2

13.7 parts by weight of 2-aminobenzoic acid are diazotized with 6.9 parts by weight of sodium nitrite and 15 parts by weight of 35 percent hydrochloric acid and combined with 18.9 parts by weight of 1-(4'-aminophenyl)-3-methyl-5-pyrazolone. After the addition of 15 parts by weight of 35 percent hydrochloric acid the monoazo dyestuff is further diazotized. The diazonium compound of the monoazo dyestuff is isolated, stirred again and coupled with 6.9 parts by weight of 1-amino-2-ethoxynaphthalene-6-sulfonic acid in the presence of sodium acetate. The paste of the isolated disazo dyestuff is stirred again, further diazotized with 6.9 parts by weight of sodium nitrite after the addition of 45 parts by weight of 35 percent hydrochloric acid, and the diazonium compound of the disazo dyestuff thus formed is combined with an aqueous solution of 31.9 parts by weight of 1-amino-8-hydroxynaphthalene-2,4-disulfonic acid, 420 parts by weight of pyridine and 50 parts by weight of 20 percent aqueous ammonia. The resulting dyestuff is salted out and isolated. It corresponds in the free acid state to the following formula:

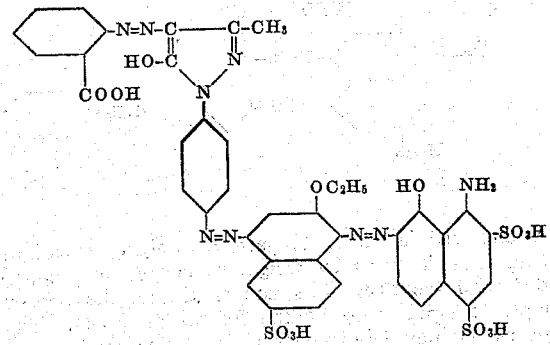

The paste of the trisazo dyestuff is dissolved in water, treated with 50 parts by weight of copper sulfate and 25 parts by weight of sodium acetate, and converted into the copper complex compound by boiling for several hours.

The copper-containing dyestuff thus obtained dyes cotton in olive shades.

Example 3

13.7 parts by weight of 2-aminobenzoic acid are diazotized with 6.9 parts by weight of sodium nitrite and 15 parts by weight of 35 percent hydrochloric acid, and coupled with 26.9 parts by weight of 1-(4'-amino-3'-sulfophenyl)-3-methyl-5-pyrazolone. The monoazo dyestuff thus formed is isolated, further diazotized with 6.9 parts by weight of sodium nitrite and 40 parts by weight of hydrochloric acid, and combined with 26.7 parts by weight of 1-amino-2-ethoxynaphthalene-6-sulfonic acid. After stirring, the disazo dyestuff formed is salted out after addition of sodium carbonate at 70° C., isolated and the paste is stirred again. The disazo dyestuff is further diazotized with 45 parts by weight of 35 percent hydrochloric acid and 6.9 parts by weight of sodium nitrite, and the diazo compound is run into an aqueous solution of 35.9 parts by weight of 2-(3'-carboxyphenylamino)-5-hydroxynaphthalene-7-sulfonic acid, 420 parts by weight of pyridine and 50 parts by weight of 20 percent aqueous ammonia. The trisazo dyestuff thus formed is isolated; it corresponds in the free acid state to the formula

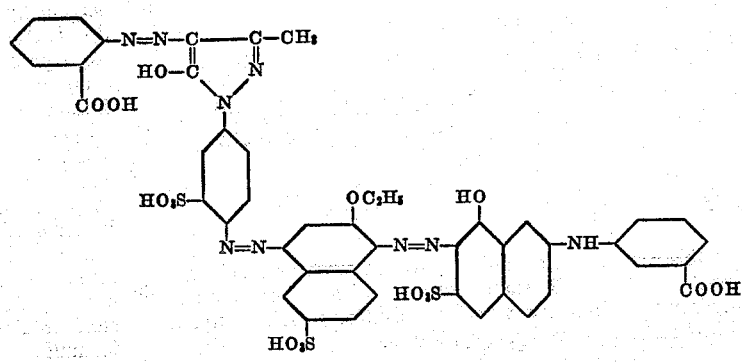

it is converted into the copper complex compound as described in Example 1.

The copper-containing dyestuff dyes cotton in green shades.

Example 4

21.7 parts by weight of 2-amino-5-sulfobenzoic acid are diazotized with 6.9 parts by weight of sodium nitrite and 15 parts by weight of 35 percent hydrochloric acid, and combined with 18.9 parts by weight of 1-(4'-aminophenyl)-3-methyl-5-pyrazolone. The amino monazo dyestuff thus obtained is further diazotized with 6.9 parts by weight of sodium nitrite and 40 parts by weight of 35 percent hydrochloric acid and the diazonium compound is coupled with 18.7 parts by weight of 1-amino-2-ethoxynaphthalene in the presence of sodium acetate. After stirring, the disazo dyestuff is salted out and isolated. The paste of the disazo dyestuff is stirred, further diazotized with 6.9 parts by weight of sodium nitrite and 40 parts by weight of 35 percent hydrochloric acid, and the diazonium compound is run into an aqueous solution of 31.9 parts by weight of 1-amino-8-hydroxynaphthalene-2,4-disulfonic acid, 420 parts by weight of pyridine and 50 parts by weight of 20 percent aqueous ammonia.

The trisazo dyestuff thus formed corresponds in its free acid state to the formula:

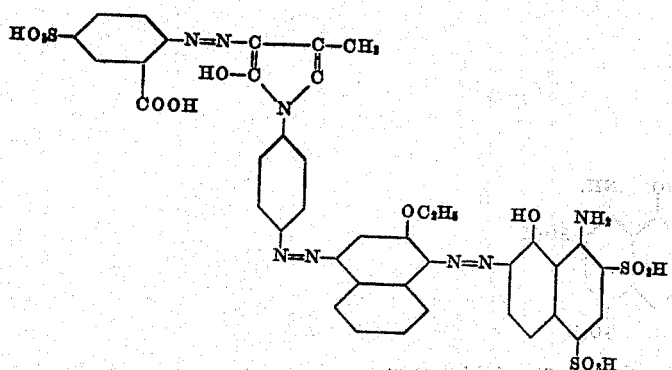

it is converted into the copper complex compound by boiling for several hours with 50 parts by weight of copper sulfate and 25 parts by weight of sodium acetate.

The copper-containing dyestuffs thus obtained dye cotton in yellowish olive shades.

We claim:

1. Copper complexes of trisazo dyestuffs corresponding to the formula

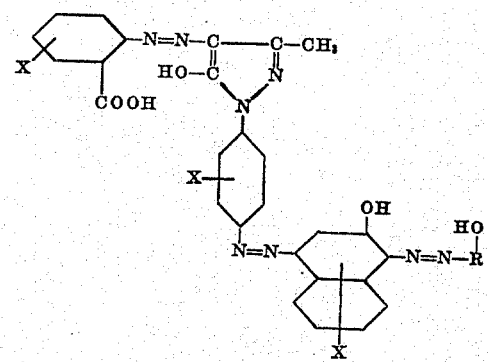

wherein X stands for a member selected from the group consisting of H and —SO₃H, and R means a radical of an amino-hydroxynaphthalene sulfonic acid bearing —OH in o-position to the azo bridge.

2. The copper complex of the trisazo dyestuff corresponding to the formula:

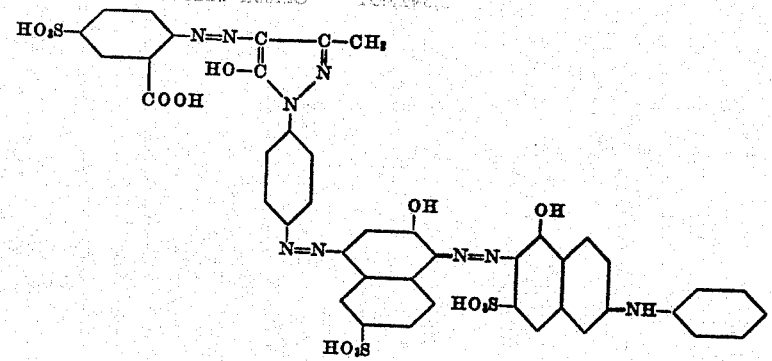

3. The copper complex of the trisazo dyestuff corresponding to the formula

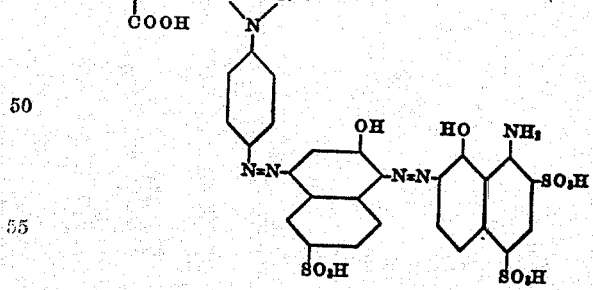

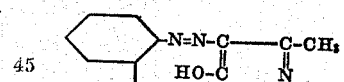

4. The copper complex of the trisazo dyestuff corresponding to the formula

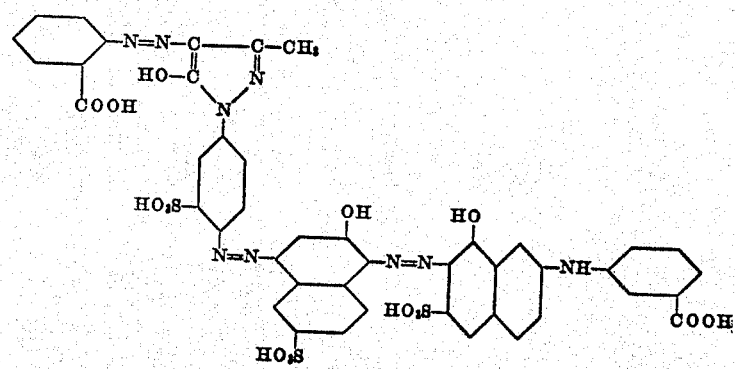

5. The copper complex of the trisazo dyestuff corresponding to the formula
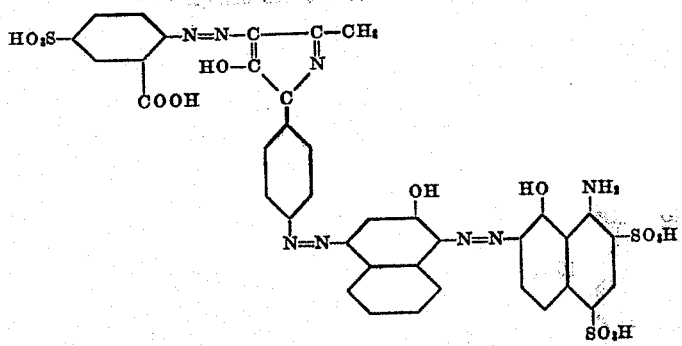
References Cited in the file of this patent
UNITED STATES PATENTS
2,195,788 Schmid _____ Apr. 2, 1940
2,342,451 Carson _____ Feb. 22, 1944